(12) United States Patent
Blin et al.

(10) Patent No.: US 8,091,954 B2
(45) Date of Patent: Jan. 10, 2012

(54) CAB MOUNTING MECHANISM

(75) Inventors: Laurent Blin, Beauvais (FR); Sebastian Brohy, Elbeuf en Bray (FR)

(73) Assignee: AGCO SA, Beauvais (FR)

( * ) Notice: Subject to any disclaimer, the term of this patent is extended or adjusted under 35 U.S.C. 154(b) by 0 days.

(21) Appl. No.: 12/921,165

(22) PCT Filed: Feb. 26, 2009

(86) PCT No.: PCT/EP2009/052295
§ 371 (c)(1),
(2), (4) Date: Sep. 6, 2010

(87) PCT Pub. No.: WO2009/109513
PCT Pub. Date: Sep. 11, 2009

(65) Prior Publication Data
US 2011/0018299 A1 Jan. 27, 2011

(30) Foreign Application Priority Data

Mar. 4, 2008 (GB) .................................. 0803998.4

(51) Int. Cl.
*B62D 33/06* (2006.01)
(52) U.S. Cl. .............. 296/190.01; 296/190.08; 296/35.1
(58) Field of Classification Search ............. 296/190.01, 296/190.07, 190.08, 35.1, 35.2, 35.3
See application file for complete search history.

(56) References Cited

U.S. PATENT DOCUMENTS

| 3,560,019 A | | 2/1971 | Moore | |
|---|---|---|---|---|
| 3,847,492 A | * | 11/1974 | Kennicutt et al. | 403/224 |
| 3,868,190 A | | 2/1975 | Moore | |
| 3,940,177 A | * | 2/1976 | Miers et al. | 296/35.1 |
| 4,684,280 A | * | 8/1987 | Dirkin et al. | 403/157 |
| 6,588,820 B2 | * | 7/2003 | Rice | 296/35.1 |
| 6,820,908 B1 | * | 11/2004 | Tousi et al. | 296/35.1 |
| 7,070,157 B2 | * | 7/2006 | Huprikar et al. | 248/636 |
| 7,261,365 B2 | * | 8/2007 | Dickson et al. | 296/190.07 |
| 2010/0176624 A1 | * | 7/2010 | Kamimae | 296/190.08 |

FOREIGN PATENT DOCUMENTS

| CA | 996153 | 8/1976 |
|---|---|---|
| EP | 0016469 A | 10/1980 |
| GB | 2363102 A | 12/2001 |
| JP | 2001039352 A | 2/2001 |

OTHER PUBLICATIONS

UK Search Report for GB0803998.4 dated May 21, 2008.
PCT Search Report for PCT/EP2009/052295 dated Sep. 11, 2009.

* cited by examiner

*Primary Examiner* — Jason S Morrow

(57) ABSTRACT

Mounting apparatus (10) for mounting a cab (12) to a chassis (14) on a utility vehicle at one of a plurality of mounting points. The mounting apparatus comprise a first member (15) being associated with the cab and a second member (16) being associated with the chassis. The members (15, 16) each have a mutually cooperating major surface which supports a portion of the weight of the cab (12). The weight is supported over a majority of the major surface thus avoiding localized stresses. The members further include engaging projections (25, 16) disposed on their major surfaces which can be engaged to restrict relative movement in a plane substantially parallel to the major surfaces. The members can be attached to the chassis (14) and the cab (12) at an early stage in the assembly, thereby allowing a saving in time and thus assembly costs.

11 Claims, 4 Drawing Sheets

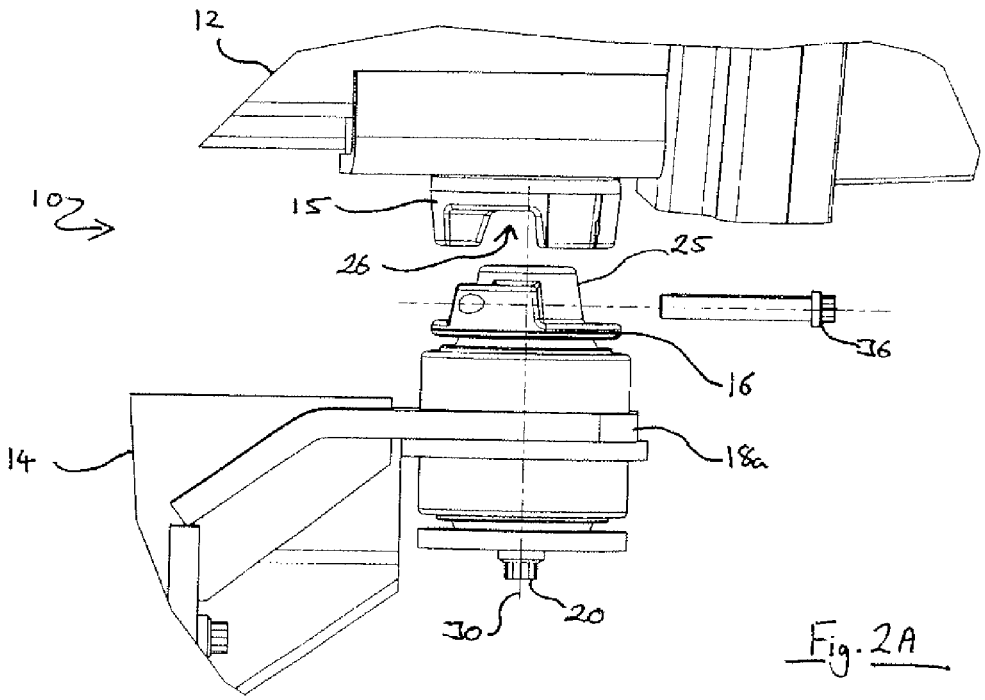
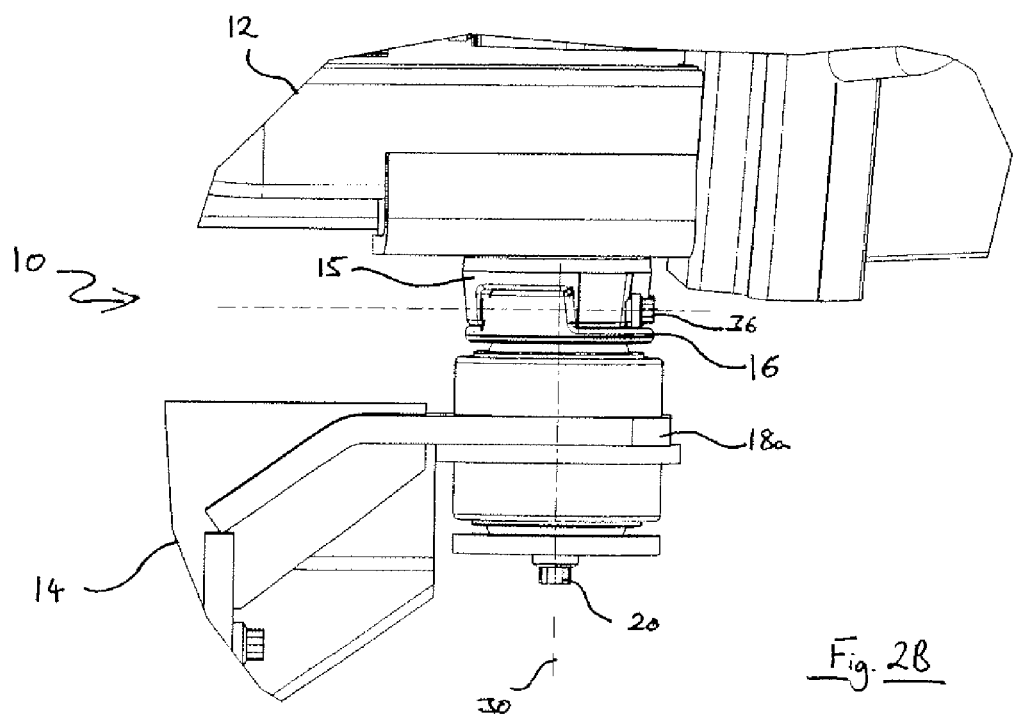

CAB MOUNTING MECHANISM

TECHNICAL FIELD

The invention relates to apparatus for mounting a cab to a chassis on a utility vehicle at one of a plurality of mounting points. The invention also relates to a method of mounting a cab to a chassis on a utility vehicle.

BACKGROUND

Utility vehicle cabs are traditionally mounted to a chassis at a plurality of mounting points. For example, this may include a mounting point at each of the four corners of the cab. During assembly, the cab is lowered onto the chassis at which point in time the respective mounting points must be aligned and held in place whilst the necessary means to fixing means are applied, such as a plurality of bolts.

It is an object of the invention to provide a method and apparatus for mounting a cab to a chassis on a utility vehicle which allows simple and relatively quick assembly of the cab and chassis.

Thus, in accordance with a first aspect of the invention there is provided mounting apparatus for mounting a cab to a chassis on a utility vehicle at one of a plurality of mounting points, the mounting apparatus comprising a first member being associated with the cab and a second member being associated with the chassis, the members each having a mutually cooperating major surface, the majority of the area of the major surface being suitable for supporting a portion of the weight of the cab, and engagement means disposed thereon which can be engaged to restrict relative movement in a plane substantially parallel to said major surfaces.

In accordance with a second aspect of the invention there is provided a method of mounting a cab to a chassis on a utility vehicle comprising the steps of fixing a first member to the cab at one of a plurality of mounting points, fixing a second member to the chassis at said one mounting point, wherein the first member and the second member each have a mutually cooperating major surface and engagement means disposed thereon, lowering the cab onto the chassis whilst aligning the first and second members, and engaging the first and second members to restrict relative movement in a plane substantially parallel to said major surfaces.

By providing each of the chassis and the cab with respective cooperating members, the assembly of the vehicle is simplified by allowing the members to self-align which holds the cab in place whilst it is secured with more permanent fixing means. Advantageously, the members can be attached to the chassis and the cab at an early stage in the assembly, thereby allowing a saving in time and thus assembly costs.

By supporting the portion of the cab weight across the cooperating major surfaces of each pair of members, the weight is spread across the area thereof thus not imparting high stresses upon any one region. This improves the stability of the mounting point.

In a preferred embodiment, the engagement means comprises projections disposed on the respective major surfaces. These projections can be simply formed by cast moulding for example, when manufacturing the members. The projections, or teeth, of one member can simply engage with receiving recesses, or depressions, in the other, cooperating, member thereby restricting relative transverse movement.

At least one projection of each member is preferably provided with a bore which mutually align when the members are engaged, the apparatus further comprising a pin which is inserted through the aligned bores so as to lock the members in position with respect to one another. This delivers a simple and quick mechanism to secure the cab to the chassis thereby preventing separation thereof.

In another preferred embodiment, the members are in the form of rigid discs. Such discs, with integrated engagement means, are particularly simple and cheap to manufacture in bulk by cast moulding.

The engagement means of one of said discs may comprise a central projection serving to prevent lateral relative movement between the respective discs, and at least one further projection disposed beyond the periphery of the central projection serving, in cooperation with a corresponding receiving depression in the other rigid disc, to prevent rotational movement therebetween around a central vertical axis.

BRIEF DESCRIPTION OF THE DRAWINGS

Further advantages will become apparent from the following description of specific embodiments with reference to the accompanying drawings in which:

FIG. 2 is front view of part of a utility vehicle comprising mounting apparatus in accordance with the invention;

DESCRIPTION OF EXAMPLE EMBODIMENTS

Figure 1:
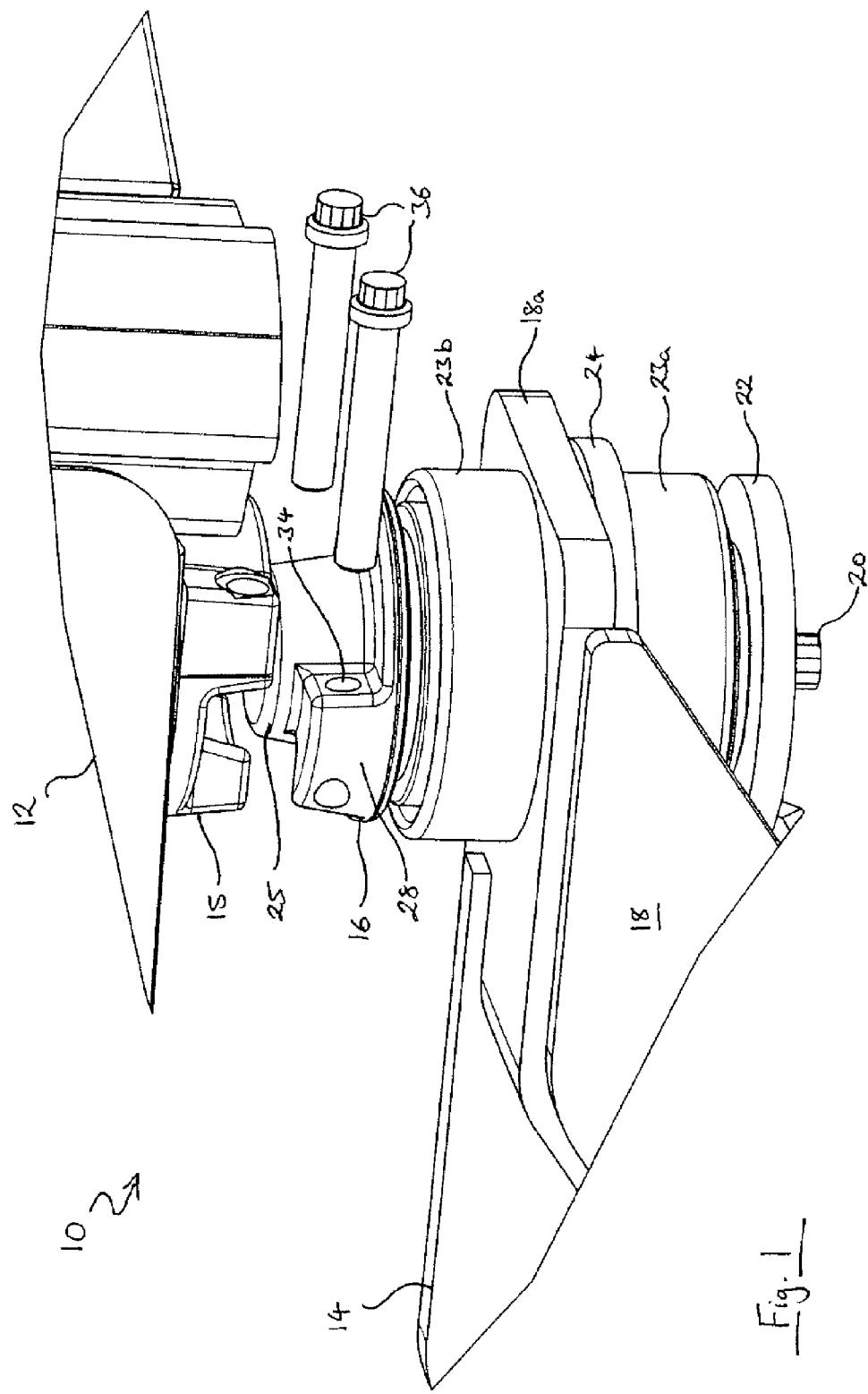
FIG. 1 is an exploded perspective view of mounting apparatus according to one embodiment of the invention.
Figure 3:
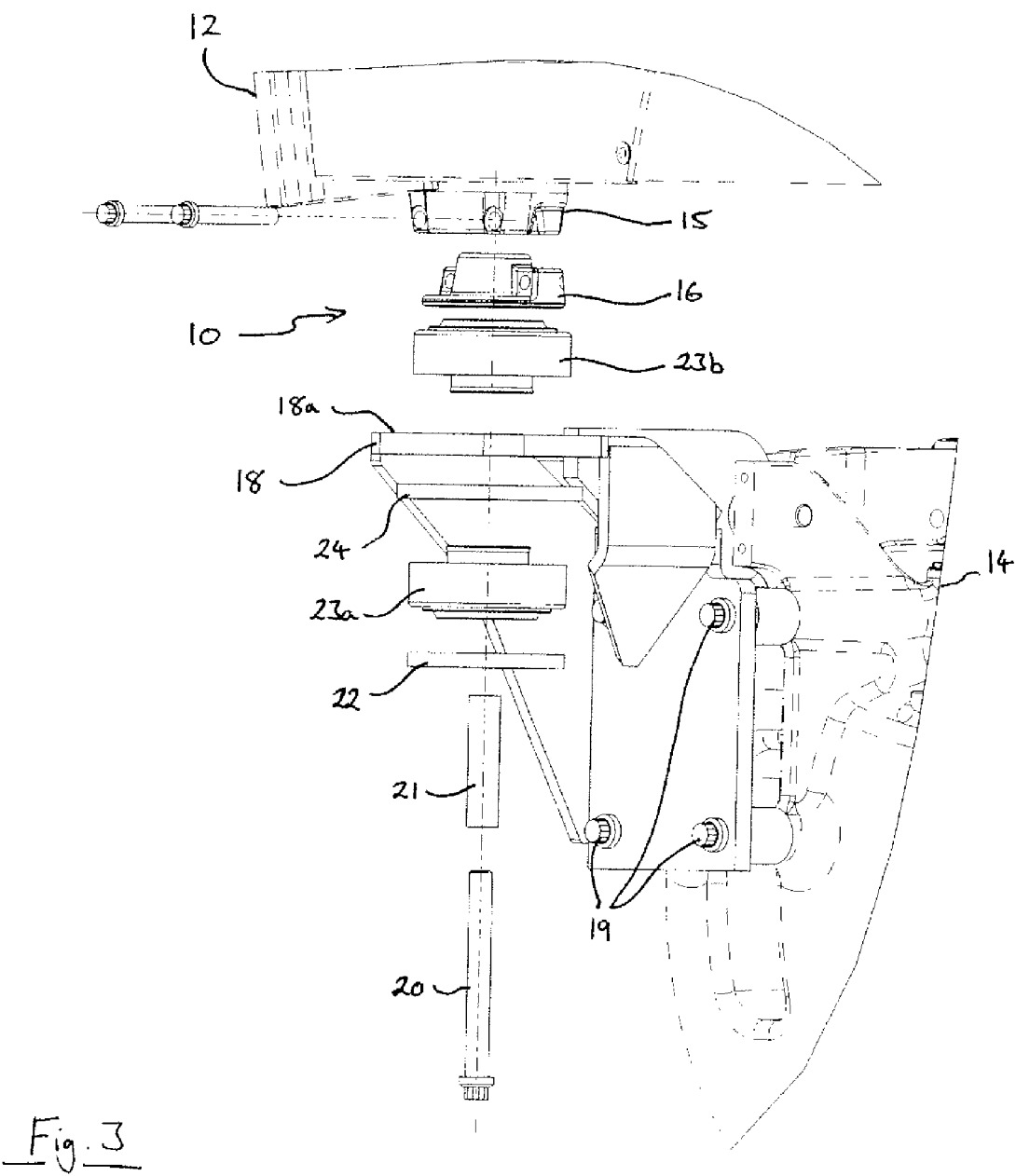
FIG. 3 is an exploded side view of the mounting apparatus of FIG. 1.
Figures 4, 5:
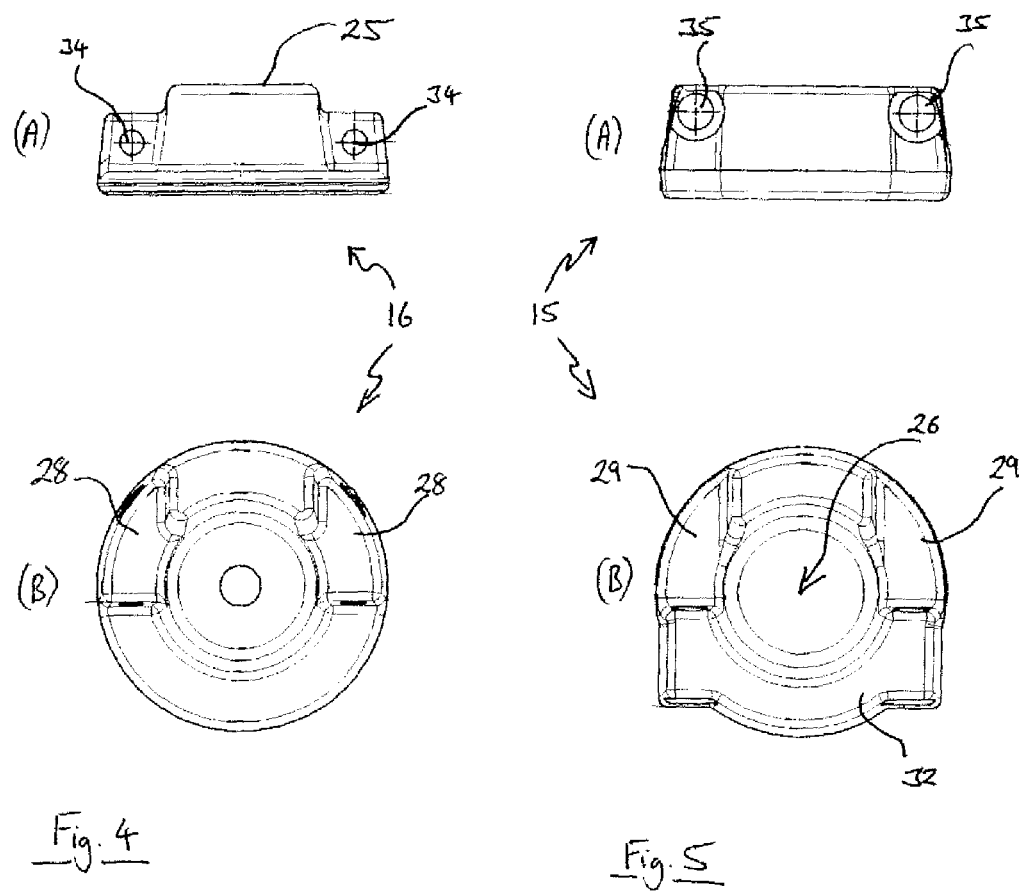
FIG. 4 is a side (A) and plan (B) view of the member associated with the chassis as shown in FIG. 1; and, FIG. 5 is a side (A) and plan (B) view of the member associated with the cab as shown in FIG. 1.

With reference to the Figures, mounting apparatus 10 are shown mounting a cab 12 to a chassis 14 of a tractor. It should be appreciated that the figures show only one of a plurality of mounting points which are disposed at respective corners of the tractor cab. In the particular example shown the mounting point is located at a front corner of the tractor cab 12. The other mounting points not shown may or may not employ mounting apparatus in accordance with the invention. In this embodiment described at least the two front mounting points corresponding to the left and right front corners of the cab 12 employ mounting apparatus in accordance with the invention.

The mounting apparatus 10 comprise a first rigid disc 15 being associated with the cab 12, and a second rigid disc 16 being associated with the chassis 14. The first and second rigid discs will be referred to as cab disc 15 and chassis disc 16 respectively hereinafter.

The cab disc 15 is welded to the underside of the cab 12 and forms part of the cab which is delivered to the chassis during assembly.

The chassis disc 16 is mounted to a bracket assembly 18 which is itself bolted to the chassis 14 by bolts 19. The bracket assembly 18 provides a horizontal mounting plate 18a which comprises a hole through which a bolt 20 is inserted. Working from the underside, the bolt 20 inserts through a spacer 21, a lower washer 22, a lower damping member 23a, a further washer 24, the mounting plate 18a, an upper damping member 23b and the chassis disc 16. The bolt 20 is secured in position by a nut (not shown) secured to the end thereof. This is attached to the chassis before the cab is delivered to the chassis on the assembly line.

The cab disc 15 and the chassis disc 16 each have a mutually cooperating surface. The chassis disc 16 comprises a central projection 25 and cab disc 15 comprises a corresponding receiving depression 26. Therefore, when the cab 12 is lowered on to the chassis 14 the central projection 25 engages with the corresponding depression 26 so as to restrict lateral movement between the respective discs 15, 16.

The chassis disc 16 further comprises two peripheral projections 28. These peripheral projections 28 extend outside the periphery of the central projection 25. The cab disc 15 comprises corresponding receiving depressions 29 with which the peripheral projections 28 engage when brought together. The additional projections 28, together with the cooperating depressions 29, serve to prevent rotational movement between the respective discs 15, 16 around a central vertical axis 30.

The cab disc 15 further comprises a raised region 32 which cooperates with the outside edge of the central projection 25 on the chassis disc 16. The major surfaces of the cab disc 15 and chassis disc 16, in effect, cooperate with one another and respectively engage to restrict any lateral or rotational movement between the discs. This allows during assembly for the cab to be lowered on to the chassis so that the weight of the cab 12 is supported by the aligned cooperating major surfaces of the mounting discs 15, 16 before the cab is secured further. In other words, the weight of the cab is supported on regions 25, 26, 28, 29, and 32 thus spreading the load over the majority of the major surface of each disc 15, 16.

Each of the peripheral projections 28 comprise a bore 34 which aligns with a respective bore 35 provided in the raised region 32. During assembly, when the cab 12 is resting on the chassis discs 16, bolts 36 are inserted through the respective bores 35, 34 and secured with locking nuts (not shown). The bolts 36 serve to lock the cab disc 15 and chassis disc 16 with respect to one another thereby ensuring that the cab 12 is securely mounted to the chassis 14.

Therefore the invention delivers a significant time saving on the assembly line with respect to the step of mounting the cab to the chassis. Each of the cab disc 15 and chassis disc 16 can be secured to their respective component's at an early stage in the assembly. This allows the cab 12 to be simply lowered onto the chassis whilst aligning the respective discs 15, 16 and then simply inserting two bolts 36 for each mounting point.

Although the embodiment described employs substantially circular discs, it will be appreciated by the skilled person that these may be substituted by members of any suitable shape which comprise a mutually cooperating major surface which can support the weight of the cab. Furthermore it is envisaged that the members associated with the cab and chassis respectively can be mounted such that their major surfaces are inclined with respect to the horizontal without deviating from the scope of the present invention.

In summary, there is provided mounting apparatus for mounting a cab to a chassis on a utility vehicle at one of a plurality of mounting points. The mounting apparatus comprise a first member being associated with the cab and a second member being associated with the chassis. The members each having a mutually cooperating major surface which supports a portion of the weight of the cab. The members further include engagement means disposed on their major surfaces which can be engaged to restrict relative movement in a plane substantially parallel to the major surfaces. The members can be attached to the chassis and the cab at an early stage in the assembly, thereby allowing a saving in time and thus assembly costs.

The invention claimed is:

1. Mounting apparatus for mounting a cab to a chassis on a utility vehicle at one of a plurality of mounting points, the mounting apparatus comprising a first member being associated with the cab and a second member being associated with the chassis, the members each having a mutually cooperating major surface, the majority of the area of the major surface being suitable for supporting a portion of the weight of the cab, and engagement means disposed thereon which can be engaged to restrict relative movement in a plane substantially parallel to said major surfaces, the engagement means comprising projections disposed on the respective major surfaces, wherein at least one projection of each member is provided with a bore which mutually align when the members are engaged, the apparatus further comprising a pin which is inserted through the aligned bores so as to lock the members in position with respect to one another.

2. Apparatus according to claim 1, wherein the members are in the form of rigid discs.

3. Apparatus according to claim 2, wherein the engagement means of one of said members comprises a central projection serving to prevent lateral relative movement between the rigid discs, and at least one further projection disposed beyond the periphery of the central projection serving, in cooperation with a corresponding receiving depression in the other rigid disc, to prevent rotational movement between the rigid discs around a central vertical axis.

4. Apparatus according to claim 1, wherein the members are formed from cast moulding.

5. A method of mounting a cab to a chassis on a utility vehicle comprising the steps of:
    fixing a first member to the cab at one of a plurality of mounting points;
    fixing a second member to the chassis at said one mounting point, wherein the first member and the second member each have a mutually cooperating major surface which contact one another over the majority of the area thereof, and engagement means disposed thereon and comprising projections disposed on the respective major surfaces and wherein the at least one projection of each member is provided with a bore;
    lowering the cab onto the chassis whilst aligning the first and second members;
    engaging the first and second members to restrict relative movement in a plane substantially parallel to said major surfaces; and,
    inserting a pin through the aligned bores so as to lock the members in position with respect to one another.

6. A utility vehicle, comprising:
    a cab;
    a chassis; and
    mounting apparatus for mounting the cab to the chassis at one of a plurality of mounting points, the mounting apparatus comprising a first member being associated with the cab and a second member being associated with the chassis, the members each having a mutually cooperating major surface, the majority of the area of the major surface being suitable for supporting a portion of the weight of the cab, and engagement means disposed thereon which can be engaged to restrict relative movement in a plane substantially parallel to said major surfaces, the engagement means comprising projections disposed on the respective major surfaces, wherein at least one projection of each member is provided with a bore which mutually align when the members are engaged, the apparatus further comprising a pin which is inserted through the aligned bores so as to lock the members in position with respect to one another.

7. The utility vehicle of claim 6, wherein the members are in the form of rigid discs.

8. The utility vehicle of claim 7, wherein the engagement means of one of said members comprises a central projection serving to prevent lateral relative movement between the rigid discs, and at least one further projection disposed beyond the periphery of the central projection serving, in cooperation with a corresponding receiving depression in the other rigid disc, to prevent rotational movement between the rigid discs around a central vertical axis.

9. The utility vehicle of claim 6, wherein the members are formed from cast moulding.

10. Apparatus according to claim 1, wherein the bore of the projection of the first member extends parallel to the major surface of the first member.

11. Apparatus according to claim 1, wherein the bore of the projection of the first member and the bore of the projection of the second member align and the aligned bores extend parallel to the major surface of the first member and the major surface of the second member.

* * * * *